Dec. 4, 1928.  
C. E. FERREE ET AL  
1,693,979  
PERIMETER  
Filed Dec. 26, 1922  
4 Sheets-Sheet 3
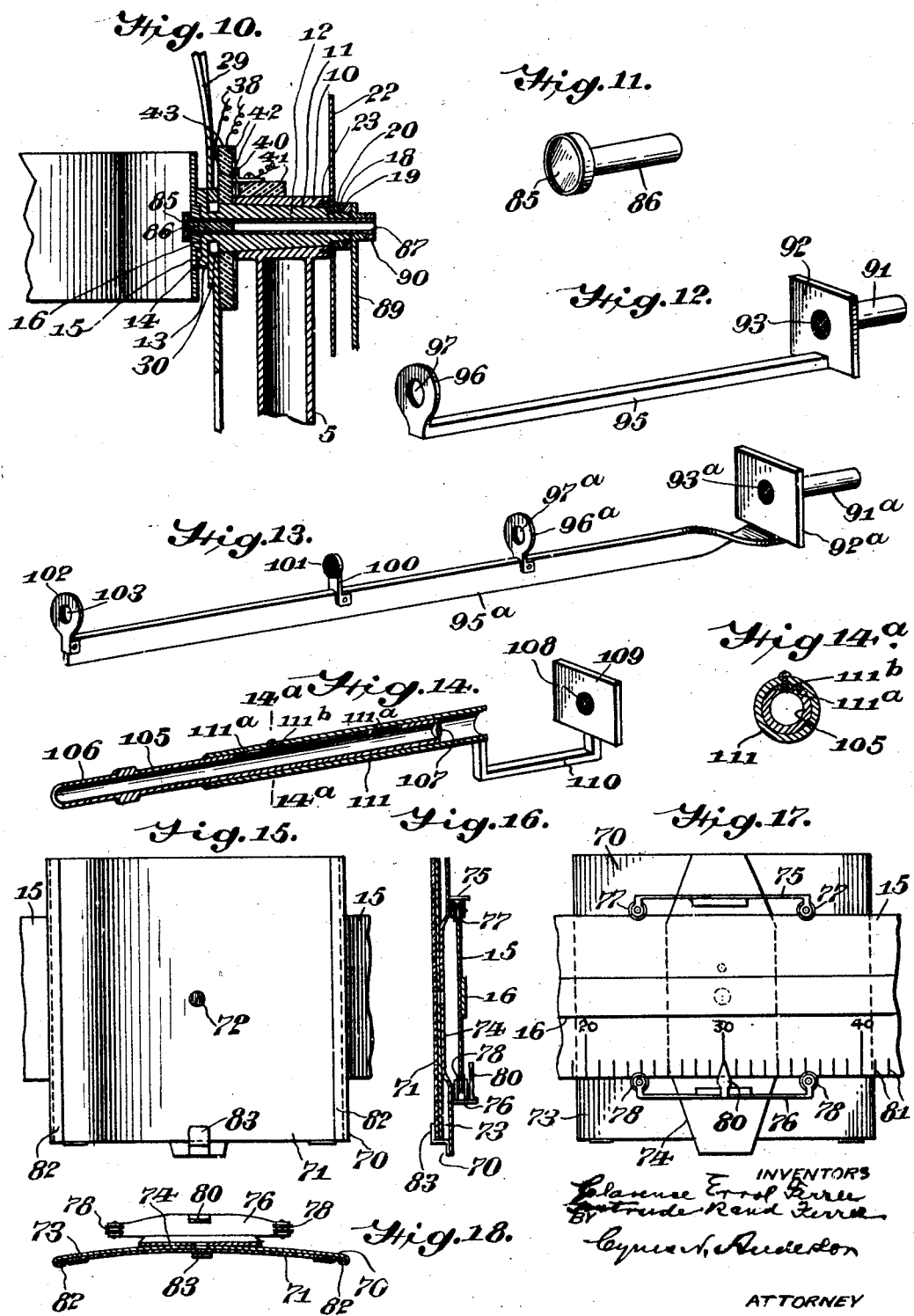

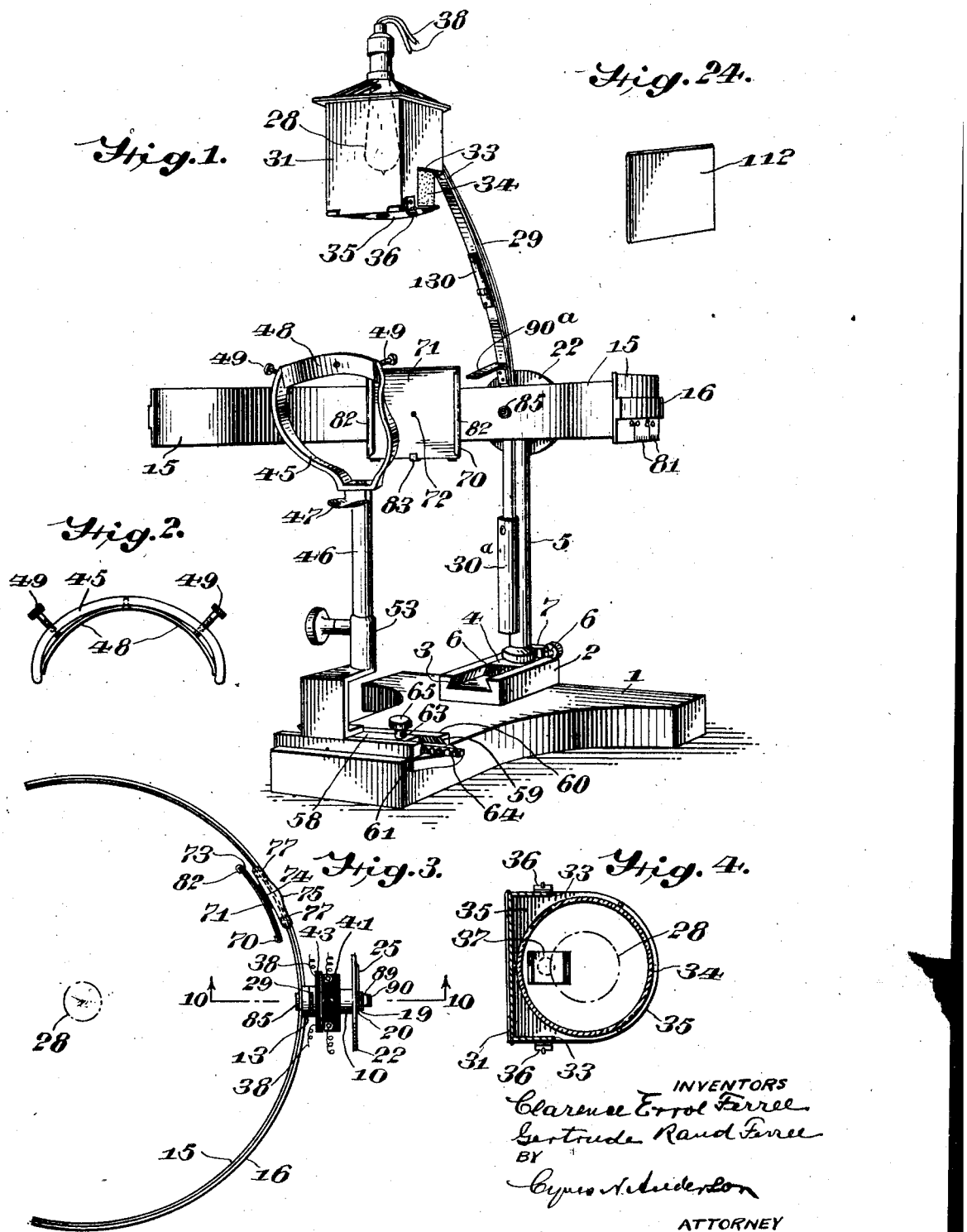

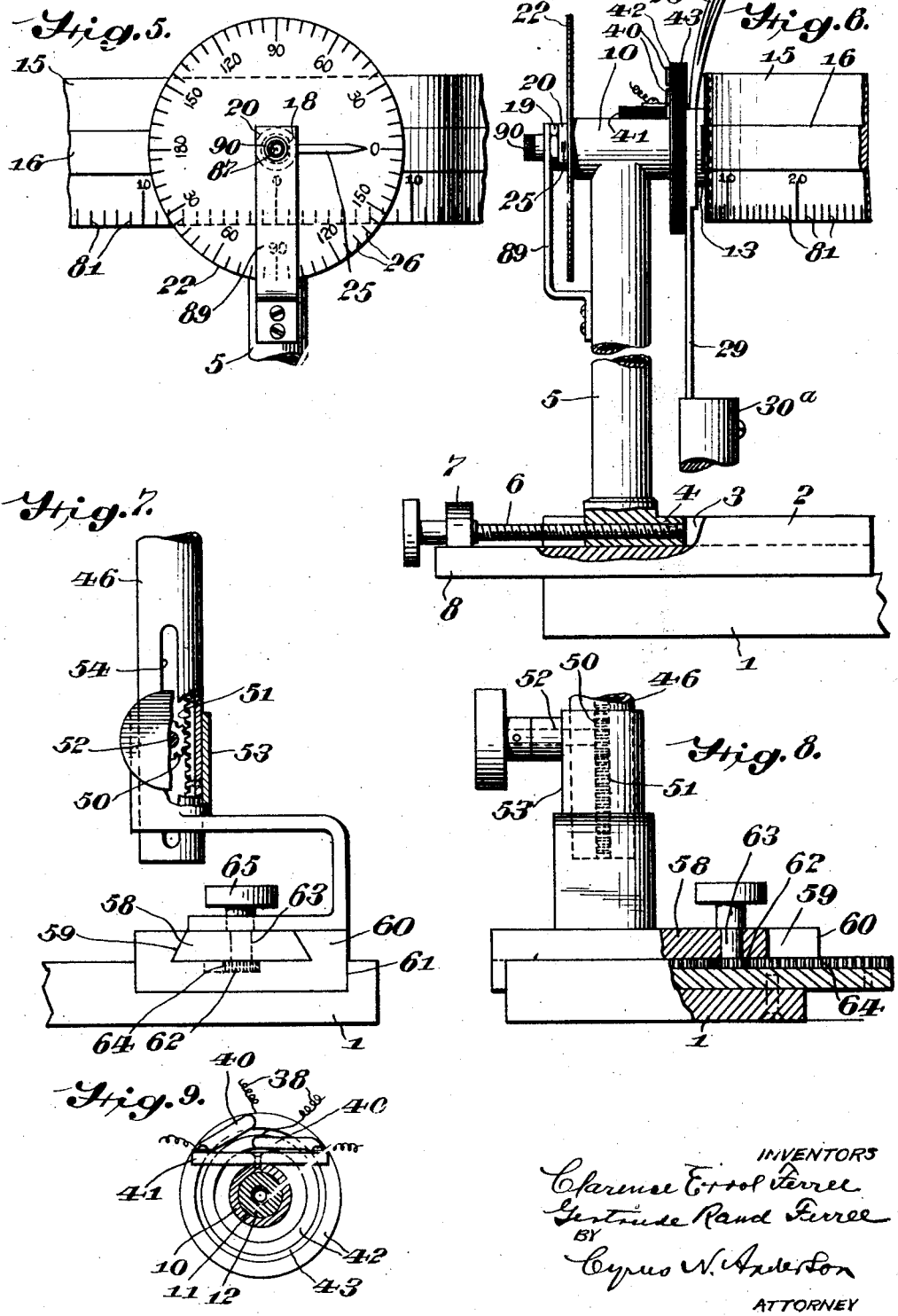

Dec. 4, 1928.                                                    1,693,979
C. E. FERREE ET AL
PERIMETER
Filed Dec. 26, 1922          4 Sheets-Sheet 4
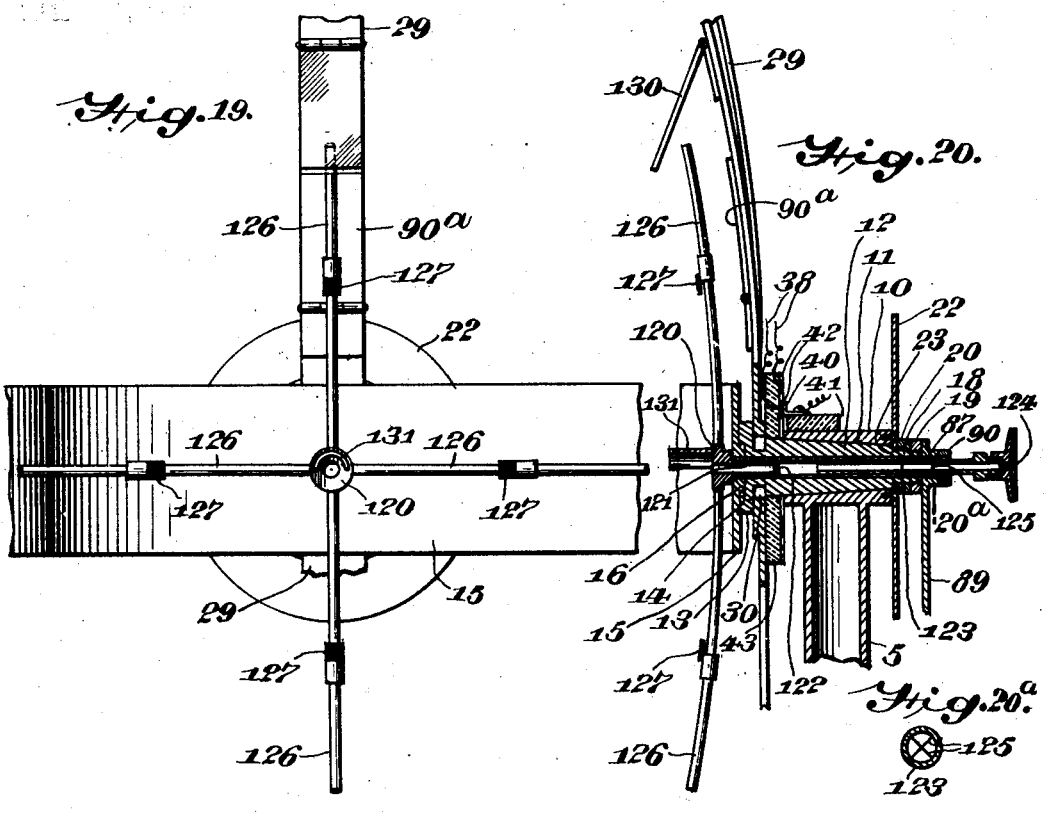
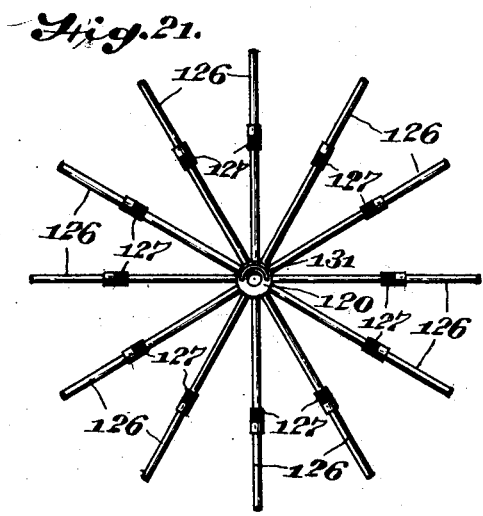
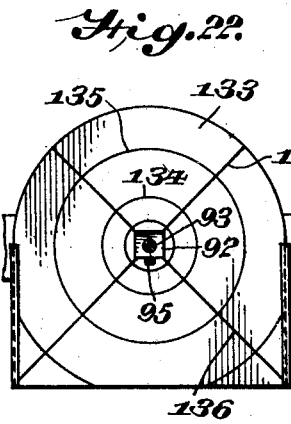
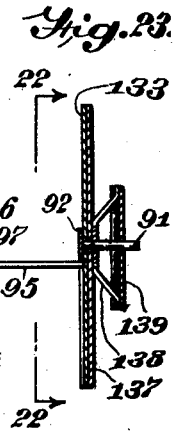
INVENTORS
Clarence Errol Ferree
Gertrude Rand Ferree
BY
Cyrus N. Anderson
ATTORNEY Patented Dec. 4, 1928.

1,693,979

UNITED STATES PATENT OFFICE.

CLARENCE ERROL FERREE AND GERTRUDE RAND FERREE, OF BRYN MAWR, PENNSYLVANIA.

PERIMETER.

REISSUED

Application filed December 26, 1922. Serial No. 608,870.

Our invention relates to perimeters adapted for testing eyes for color sensitivity and its principal object is to provide a construction of perimeter in which the perimeter arm is uniformly and equally illuminated at all correspondng points thereof.

A further object is to provide means whereby the perimeter arm may be adjusted without changing the relationship of the same with respect to the source of illumination.

A still further object of the invention is to provide an improved and novel construction of means whereby a more accurate fixation of the eye which is being tested for color sensitivity and for mapping blind areas therein may be more accurately effected.

A still further object of the invention is to provide novel means whereby the device may be readily adapted for testing eyes whether myopic, hyperopic, or presbyopic.

We have made no endeavor to set forth at this point all of the various objects and advantages of our invention and other objects and advantages thereof will be pointed out in the detailed description thereof which follows or will be apparent from such description.

In order that the invention may be understood more readily and its practical advantages fully understood and appreciated reference should be had to the accompanying drawings in which one form of mechanical embodiment thereof together with various attachments therefor is shown. However, it will be understood that the invention is susceptible of embodiment in other forms of construction than that shown and that various changes in the details of construction may be made within the scope of the claims without departing from our invention.

In the drawings:

Fig. 1 is a perspective view of a perimeter embodying our invention;

Fig. 2 is a top plan view of the head rest;

Fig. 3 is a top plan view of the perimeter with the source of illumination and the arm for supporting the same omitted;

Fig. 4 is a transverse horizontal sectional view of the lamp house or chamber in which the source of illumination is situated;

Fig. 5 is a view in rear elevation of a portion of the perimeter arm, the upper end portion of the post or standard for supporting the same and the position indicating means associated therewith;

Fig. 6 is a view partly in side elevation and partly in section of a portion of the perimeter structure including the post or standard therefor;

Fig. 7 is a view partly in side elevation and partly in section of another portion of the said structure;

Fig. 8 is a view partly in front elevation and partly in vertical section of the portion of the structure shown in Fig. 7;

Fig. 9 is a vertical sectional view through the head of the post and a trunnion by means of which the perimeter arm is supported rotatably, which view also shows in rear elevation connections for the circuit leading to the electric light employed as the light source;

Fig. 10 is a vertical sectional view taken on the line 10—10 of Fig. 3, a portion of the perimeter arm being broken away as indicated and a portion of the arm for supporting the source of illumination being shown;

Fig. 11 is a perspective view of a mirror device employed under some conditions as a fixation object;

Fig. 12 is a perspective view of a parallax or peep-sight device employed to effect fixation of the eye under examination;

Fig. 13 is a perspective view of a device similar to that shown in Fig. 12 but which is adapted for use both for the fixation of the normal eye or for the fixation of an eye which is myopic;

Fig. 14 is a perspective view of a fixation device adapted to be employed in the testing or examination of eyes which are strongly hyperopic or presbyopic;

Fig. 14$^a$ is a transverse sectional view taken on the line 14$^a$—14$^a$ of Fig. 14;

Fig. 15 is a view showing a portion of the perimeter arm in front elevation with a stimulus carriage mounted thereon and a card upon said carriage having a stimulus object at its center;

Fig. 16 is a transverse vertical sectional view of the same;

Fig. 17 is a view in rear elevation of a portion of the perimeter arm and of the stimulus carriage shown in Fig. 15;

Fig. 18 is a horizontal sectional view of the same;

Fig. 19 is a view in front elevation of the central portion of the perimeter arm and of the lower portion of the arm for supporting the light source provided with a device for controlling the fixation of an eye having a blind spot or scotoma at the center of the field thereof;

Fig. 20 is a vertical central sectional view of the structure shown in Fig. 19;

Fig. 20ª is a transverse sectional view taken on the line 20ª—20ª of Fig. 20 in order to show the cross hairs in the tube of the telescope shown in Fig. 20;

Fig. 21 is a view in front elevation of a device for controlling the fixation of an eye having a central blind spot or scotoma provided with a greater number of radial arms than are shown in Fig 19 which arms may be used for outlining the blind area;

Fig. 22 is a view taken on the line 22—22 of Fig. 23 and showing in front elevation a tangent screen adapted to be employed for the quick detection and mapping of central and paracentral scotomata, portions of the main support therefor being shown;

Fig. 23 is a vertical central sectional view of the structure shown in Fig. 22 the portions of the main support therefor, shown in Fig. 22, being omitted; and Fig. 24 is a perspective view of a pre-exposure card.

Referring to the drawings: 1 designates a base which with the parts supported thereon preferably is portable. 2 designates a block secured in any suitable manner upon the top side of the base 1. The said block is provided with an undercut slot 3 within which is situated the enlarged base-like end 4 of the lower end of the post or standard 5. The said base-like portion 4 together with the post or standard thereof and parts carried thereby is adjustable within the undercut slot 3 by means of the screw-threaded rod 6, the outer rear end of which is supported in a bearing 7 which in turn is supported upon an extension 8 (see Fig. 6) projecting rearwardly from the block 2. The upper end of the post 5 terminates in a T-shaped head 10 having an opening 11 extending therethrough which opening is tapered from the front to the rear as clearly shown in Figs. 10 and 20. Mounted within the tapered opening 11 is a correspondingly tapered trunnion 12. The said trunnion is provided at its front end with a flange 13 and with a square cornered groove 14 which extends across the face thereof. A perimeter arm 15 is secured to the front end of the said trunnion by means of screws, not shown, or otherwise as may be preferred. The said perimeter arm is provided with a rib or thickened strengthening portion 16 upon the outer rear surface thereof and which extends throughout its entire length. A portion of this rib at the center of the perimeter arm is situated within the groove 14 previously referred to. The perimeter arm is in the form of a one hundred and eighty degree arc.

The rear end portion of the trunnion 12 is reduced, as indicated at 18, and the outer end part of the reduced portion is screw-threaded for the reception of a nut 19, the inner or front side of which bears against a washer 20 which is secured to the trunnion 12 so as to rotate therewith. Such connection may be made in any manner desired. A circular plate 22 is secured by means of screws to the rear end of the T-shaped head 10 previously referred to and the reduced rear portion 18 of the trunnion 12 passes through an opening 23 through the center of the said plate. The washer 20 bears or is seated against the inner edge portion of the said plate surrounding the opening 23 therethrough. The said washer is provided with a horizontally extending pointer 25 which is adapted to co-operate with the stationary scale 26 upon the rear outer edge portion of the circular plate 22.

For the purpose of uniformly illuminating the inner surface of the perimeter arm 15 we have provided an electric light as indicated at 28 which is situated a distance considerably above the plane of the perimeter arm 15. Although in the construction we have employed an electric light as the source of light it will be understood that any preferred form of light source may be employed. The said light is located in the polar axis of a circle comprising the one hundred and eighty degree perimeter arm 15 so that the inner surface of the said arm is uniformly illuminated at all points and the intensity of the illumination is the same at all corresponding points thereof. The light 28 is supported upon the upper outer end of a ninety degree arm 29 which is provided with an opening 30 within which the inner end portion of the trunnion 12 adjacent the flange 13 is situated and by means of which the said arm is supported. The said light supporting arm is secured to the flange 13 and to the perimeter arm in any desired manner, as by means of screws, not shown. It is apparent that the light supporting arm 29 and the perimeter arm 15 as well as the trunnion 12 rotate together. The lower end of the arm is extended and is provided with a counter-balance weight 30ª.

For the purpose of shielding the eyes of the person whose eyes are being tested and those of the person who is testing without interfering with the distribution of light to the perimeter arm 15, we have provided a lamp house 31 within which the light 28 is situated. The walls of the lamp house are opaque and preferably the inner surfaces thereof are a mat black. In order that the inner surface of the perimeter arm may be illuminated the lower portion of the rear wall is removed and also portions of the side walls, as indicated at 33. For the purpose of filtering the light from the light source to daylight quality the opening formed by the removal of the portions of the walls of the lamp house, as described, is closed by a portion of a blue glass cylinder 34 the outer surface of which is etched so as to effect proper diffusion of the light. The light which is transmitted through this glass is of daylight quality. Instead of employing the cylinder of glass 34 we may employ a lamp having a blue bulb; that is to say, the ordinary blue bulb commercial lamp which produces light of approximate daylight quality. The surface of the said bulb should be etched.

By reason of the fact that the front and bottom portions of the lamp house are closed, as indicated, the light from the light source is prevented from shining directly into the eyes of the person whose eyes are being examined.

For the purpose of facilitating the insertion of a lamp within the lamp house and securing the same within the socket provided therefor the lower or bottom side 35 of the said house is pivotally connected to the front wall of the said house and is adapted to be retained in closed position by means of catches 36 which may be released. To aid in ventilating the interior of the lamp house in case the window or opening 33 is closed by means of a cylinder of glass 34, as shown, an opening is provided in the bottom 35 of the lamp house over which a small plate 37 is secured, the presence of which prevents light from shining out through the said opening. Current for the lamp 28 is supplied through the wires 38 which are connected to the line wires by means of suitable contacts 40 (see Fig. 9) which are supported upon an insulating block 41 which in turn is supported upon the T-shaped head 10. The contacts 40 respectively engage with contact rings 42 which are supported upon a disk 43 of insulating material which is secured to the arm 29 and rotates therewith and with the perimeter arm 15 and trunnions 12.

A head rest 45 supported upon the post 46 at the front of the apparatus is provided for adjusting and holding the head in proper position with respect to a fixation object at the center of the perimeter arm 15. The said head rest 45 comprises a portion 47 upon which the chin of a person whose eyes are being examined rests while the upper portion of said head rest is provided with a spring member 48 which is adapted to contact with the forehead of such person and the opposite end portions of the said spring are adapted to be adjusted by means of adjustable contact screws 49 the inner ends of which contact with the outer sides of the opposite end portions of the said spring member 48. The post 46 which supports the head rest 45 is adapted to be adjusted vertically by means of a pinion 50 situated interiorly of the said post and which is in engagement with a rack 51 secured upon the interior of said post. The pinion is supported upon a shaft 52 which is journaled in an opening in one side of a short tubular post 53. The said shaft 52 extends through a slot 54 in one side of the post 46 (see Figs. 7 and 8). The short tubular post 53 is supported upon the rear end of an arm which arm, as a whole, is of U-shape, one side of which constitutes a base and is secured to an adjustable block 58 which is supported within an undercut slot 59 in a block 60 which in turn is supported within a relatively wide square cornered slot 61 which extends transversely of the forward end portion of the base 1. Adjustment of the block 58 within the undercut slot 59 is effected by means of a pinion 62 secured to the lower end of a pinion shaft 63 which extends through the base portion of the arm 57 and also through the block 58. The said pinion is in engagement with a stationary rack 64 secured to the block 60. Rotation of the pinion shaft 63 is effected by means of a finger wheel 65. The direction of adjustment of the block 58 and of the parts carried thereby depends upon the direction of rotation of the pinion 62.

Adjustably or movably mounted upon the perimeter arm 15 is a stimulus carriage 70 which is adapted to receive and hold a stimulus card 71 having at the center thereof a disk 72 of appropriate color which subtends a visual angle of one degree. The distance from the eye which is being examined to the color disk 72 and to a fixation object at the center of the perimeter arm should be thirty-three centimeters. The visible portion of the stimulus carriage 70 and also the perimeter arm are of a color approximately mid-gray to the blue and yellow which are the darkest and lightest of the stimuli employed. The card 71 is a gray of the same brightness as the stimulus disk 72 as it appears at the peripheral limit of sensitivity to that color the purpose of which is to avoid physiological induction.

The stimulus carriage 70 comprises a plate 73 of suitable material, such as aluminum, to the rear side of which a transversely extending relatively narrow strip 74 is secured. To the latter are secured bars 75 and 76 which extend transversely of the strip 74 and in parallel relation with respect to the adjacent edges of the perimeter arm 15. These bars 75 and 76 are provided with grooved wheels 77 and 78 which engage the upper and lower edges respectively of the perimeter arm. The bar 76 is provided with a pointer 80 which cooperates with the scale marks 81 upon the rear side of the lower edge portion of the perimeter arm as shown. The stimulus cards are held upon the stimulus carriage by means of the inwardly turned flanges 82 upon the opposite side edges of the metal sheet 73 and by means of a hook 83 upon the lower edge of the said metal sheet.

It is apparent that the stimulus carriage may be adjusted or moved to any position desired upon the perimeter arm 15.

In the use of the perimeter in the examination of eyes for the purpose of determining the color sensitiveness of the eyes, for ascertaining and mapping the area of dark or blind spots in the eye, for the examination of eyes afflicted with scotoma, etc., it is necessary that the eye under examination shall occupy a certain fixed position. It is, therefore, necessary that means be provided by the employment of which fixation may be effected. Various devices have been designed by us and used depending upon the condition of the eye examined. For the purpose of examination of the normal eye a mirror may be employed as a fixation object. The mirror comprises a small reflecting disk 85 mounted at the front end of a stem 86. The latter is adapted to be inserted into the front end of a stationary tube 87 which extends through a central axial opening within the trunnion 12. The rear end of the tube is screw-threaded and has screw-threaded engagement with the upper end of a bracket 89 supported upon the post 5. For the purpose of securing the said tube firmly and permanently in position a lock nut 90 is provided. The trunnion 12 together with the perimeter arm 15 and the arm 29 secured thereto and also the block of insulating material 42 are rotatable about the tube 87, but the latter is stationary so that the mirror 85 also is stationary and is unaffected by the rotatable adjustment of the said perimeter arm and the lamp supporting arm 29.

When the mirror is employed as a fixation object the person whose eyes are being examined places his head in position upon and against the head rest 45 and the latter is adjusted in the manner hereinbefore indicated to bring the eye being examined in position so that the image of the eye is reflected from the mirror back to said eye. This image is held by the observer while the examination is being made. One objection to the use of a mirror as a means of controlling fixation is the liability of glare from its surface. This objection has been obviated by cutting of the direct radiations from the light source to the mirror by a narrow shield 90ª pivotally supported upon the arm 29 which may be turned down into the position as indicated in Fig. 1, in which position the mirror is shielded. When the mirror is not in use or some other fixation means is to be employed the shield 90ª may be turned upwardly against the arm 29, as shown in Fig. 20 of the drawings.

Instead of employing a mirror, such as is shown in Figs. 1, 10 and 11, a peep-sight or parallax device, such as is shown in Fig. 12, may be employed. This device comprises a stem 91 which is adapted to be inserted into the front end of the tube 87 a relatively small square plate 92 is secured at its center to the front end of said stem. The axis of the stem is in alinement with the geometrical center of said plate. The said plate is of a mid-gray color. At the center of this plate is a small black circular disk 93, about eight millimeters in diameter, which disk is situated at the center of rotation of the perimeter arm. The said black disk 93 may or may not be provided with gray cross lines as indicated. Extending forwardly from the lower edge of the plate 92 is an arm 95 the front end of which terminates in a circular disk 96 having a small circular opening therein approximately seven millimeters in diameter, the inner edge of which is painted black, as shown. The said disk 96 as well as the arm 95 is of a mid-gray color the same as that of the perimeter arm 15.

In the use of this device the eye is positioned by means of the head rest and the fixation object. The disk 93 is viewed through the opening 97. It will be found that not only may the entire disk 93 be observed but that surrounding the same will be a gray band. The eye is held in this position while the test as to color sensitivity is employed.

In Fig. 13 is shown a device somewhat similar to Fig. 12 but which is adapted for the examination of eyes which either are normal or which may be myopic. This device comprises a stem 91ª to the front end of which a relatively small square plate 92ª is secured at the center of which is a black colored disk 93ª having across the face thereof the gray lines, as in Fig. 12, which disk is eight millimeters in diameter. Extending forwardly from the bottom edge of the disk 92ª is a relatively long steel arm 95ª which is provided at a point approximately nine centimeters in front of the disk 92ª with a circular metal disk 96ª having an opening 97ª therethrough, the diameter of which is approximately seven millimeters. The disk 96ª is pivotally supported upon the arm 95ª and may be turned downwardly into a horizontal position upon the top of the said arm, if desired.

Situated forwardly of the disk 96ª is a support 100 pivotally connected with the said arm and having at its upper end a black circular disk 101 which is approximately eight millimeters in diameter and across the face of which gray crossed lines are shown. Situated at the end of the arm 95ª is a circular disk 102 which is pivotally connected with the said arm. The said disk is provided with an opening 103 which is approximately six millimeters in diameter. The inside of this opening as well as of the opening 97ª is painted black. The disk 102 is situated approximately nine and nine-tenths centimeters in front of the disk 101 while the latter is situated approximately eight centimeters in front of the disk 96ª while the latter is situated approximately nine centimeters in front of the square plate 92ª. In the use of the device shown in Fig. 13 for examination of the normal eye the disks 102 and 100 are turned downwardly so as to occupy a substantially horizontal position upon the upper side of the bar 95ª and in the use of the latter in the examination of a myopic eye the disk 96ª is likewise turned down in a substantially horizontal position upon the upper side of the arm 95ª.

In the examination of a presbyopic or a hyperopic eye some difficulty is encountered because of the lack of ability of a person with such an eye to see clearly and distinctly the target or fixation object. For the purpose of examination of an eye of this character a device such as that shown in Fig. 14 is employed which comprises a tube 105 the forward end 106 of which is adapted to be inserted into the rear end of the tube 87. A lens 107 is secured in the rear end of this tube in alinement with a target or fixation object 108 upon the front side of a square plate 109 of the same shade of gray as the remainder of the perimeter. The plate 109 is supported at the rear end of an arm 110 which extends rearwardly from the rear end of a tube 111. If the object or target is situated at the principal focus of the lens 107 it will be understood that the rays therefrom, after they have passed through the said lens, will be parallel to each other and will reach the eye in that condition or relation thus permitting the eye to properly see the said object. The tubes 105 and 111 are in telescoping relation with respect to each other and as shown the former projects into the latter. For the purpose of limiting the extent of the longitudinal adjustments or movements and also for the purpose of preventing relative rotative movement with respect to each other, the inner tube is provided with a flattened portion, as indicated at 111ª, which terminates in shoulders at its opposite ends as shown. A thin flat plate or disk 111ᵇ is secured in any suitable or desired manner upon the inner side of the outside tube 111, and is seated upon the flattened portion 111ª of the tube 105. The shoulder nearest the rear end of the tube 105 is so positioned that when the plate or disk 111ᵇ contacts therewith the stimulus object 108 is situated at the point of the principal focus of the lens 107, so that the rays from the said object after they have passed through the lens 107 will be parallel to each other. Upon adjustment or movement of the tube 111 forwardly so as to move the stimulus object 108 carried thereby into position intermediate the lens 107 and its principal focus the rays of light from the said object will diverge after having passed through the said lens. It will be seen, therefore, that the device as illustrated in Fig. 14 provides means for a clear vision for the presbyopic eye with no power of accommodation and also that it allows a full use of the accommodation over a range of optical distance of from six meters to thirty-three centimeters. It is desirable that the patient shall use all of the accommodation he has up to three diopters in order that the fields shall be taken with the eye as nearly as possible focused for the perimeter arm. Since the test object 108 must be viewed through tubes 87, 105, and 111 it will be seen that the means illustrated in Fig. 14 constitutes a parallax device for lining up the eye to be tested with the center of the perimeter arm and for controlling the direction of gaze or fixation of said eye.

In the employment of the perimeter with the devices as above described, the head of the observer is placed in the head rest and the eye placed in position as above described and the observer is then told to take his fixation. The stimulus carriage is placed upon the perimeter arm at about the position at which the test is to be made and the card having the stimulus color disk thereon is covered by means of a pre-exposure card 112, shown in Fig. 24 of the drawings, the color of which is the same gray as the stimulus card. This card is removed and while still holding his eye steadily upon the mirror 85 or upon the fixation objects 93, 93ª or 108, as the case may be, the observer notes whether or not he is able to see and differentiate the color of the stimulus disk upon the stimulus card. By reason of the fact that the color of the stimulus disk is of the same brightness as that of the gray color upon the stimulus card the stimulus; that is to say, the stimulus disk, disappears completely when the limit of sensitivity of the eye under examination to that color is reached instead of turning into a gray concerning the color of which the patient or observer is apt to be in doubt. This gives the effect of the disappearance type of photometer and like it adds greatly to the ease and certainty of making the judgment.

The purpose of employing for the pre-exposure card a gray of the brightness of the stimulus disk is to prevent the occurrence of after-image effects during the exposure of the stimulus disk upon removal of the pre-exposure card.

In Figs. 19 to 21 we have shown attachments by means of which the apparatus is designed for the examination of a patient whose eyes are afflicted with scotoma or who may have very large blind or dark spots at the centers of the eyes. In the employment of the perimeter for the examination of eyes so afflicted or defective a telescope is employed which will now be described. The telescope comprises a member 120 having a tubular stem 121 which extends rearwardly therefrom and which is adapted to be inserted into the forward end of the tubular member 87 previously referred to. The opening of the tubular stem extends forwardly through the member 120, as shown in Fig. 20 of the drawing. At its rear end the tubular stem 121 is provided with a lens 122. A tube 123 is also provided which is adapted to be inserted into the tube 87 from the rear end thereof. The said tube 123 is provided with a lens 124 at its its rear end and cross hairs 125 are provided within the said tube 123. Curved arms 126 extend radially from the member 120, as shown in Figs. 19 and 20. These arms are provided with square black disks 127 which are adjustable thereon. In the examination of the patient's eyes the physician looks through the telescope at an eye of the patient which is under examination, which eye is directed directly toward the opening through the member 120. When the point of crossing of the cross hairs 125 is in alinement with the center of the pupil of the eye and while held in such position by the patient the physician moves the black disks 127 upon the arms into such position that all of them may be seen by the eye being examined so long as the eye remains in the fixed position but at least one of which will pass from view the very moment that the eye is moved to the slightest extent. These black disks 127 then serve the patient as eccentric fixation objects. If it is desired to accurately map such blind spot the device as shown in Fig. 21 may be employed in which there are a larger number of radial arms 126 employed. By adjusting the disks 127 upon the arms as shown in Fig. 21 the outline of the blind area or field in the eye may be mapped with accuracy.

In making the examination as just described a mirror 130 pivotally mounted upon the inner side of the arm 29 is placed in position to reflect the light from the light source into the eye from which it is reflected to the eye of the physician or person who may be looking through the telescope. Such person is thereby enabled to more clearly see the eye in order to properly determine when the center of the pupil thereof is in alinement with the point of crossing of the cross hairs 125.

It has also been found of advantage to provide a hood 131 upon the member 120 above the inner end of the opening therethrough which hood is curvilinear in cross-section, as shown, and shields the said opening.

As a simple and convenient means for mapping the normal blind spot and for the quick detection and mapping of central and paracentral scotomata we have employed a tangent screen, such as is shown in Figs. 22 and 23 of the drawing. This tangent screen consists of a card 133 of gray color of the same brightness as the color to be used in the test and having concentric circular lines 134 and 135 thereon. The circular figures formed by these lines are bisected by straight lines 136 which intersect each other at the center of the fixation object or target 93. Although the screen is shown in the drawing in connection with a parallax or peep-sight fixation device, it may be used in connection with any of the other fixation devices shown. The circular and cross lines divide the face of the screen into zones or sections thereby facilitating the outlining or mapping of the blind spot of an eye. The card 133 is supported upon a plate 137 having arms 138 which project rearwardly therefrom to which a narrow plate 139 is secured which is slightly curved, as indicated, and the opposite ends of which are adapted to engage the flanges 82 of the carrying or supporting plate of the stimulus carriage. The card 133, plate 137 and plate 139 are provided with registered openings which are adapted for the insertion of the stems of parallax or peep-sight fixation devices.

The patient whose eyes are being examined places his head in the head rest as heretofore described and fixes one eye upon the fixation object in the manner already described whereupon the physician or person making the examination moves a color test object to different positions upon the surface of the screen 133 and marks thereon the line of division between the area upon the screen which is invisible to the observer and the surrounding portion thereof which is visible.

It will be seen that we have provided a device or apparatus in which a most efficient means is employed for effecting uniform illumination of the part or parts to be illuminated; and it also will be seen that by our invention we have provided a device or apparatus by the use of which more accurate results may be obtained in the examination of an eye than heretofore has been possible.

Having thus described our invention what we claim and desire to secure by Letters Patent is:

1. A perimeter comprising a perimeter arm of arc shape, a light source located laterally of the plane of the arc of said arm, and means for supporting said light source in relatively fixed relation to said arm and in position to illuminate to the same degree all corresponding points in the observation surface thereof.

2. A perimeter comprising an arm of arc-shape, a source of illumination located a distance laterally of the plane of the said arm, and means for supporting said source of illumination in relatively fixed position with respect to said arm in the polar axis of the circle of which the said arm constitutes an arc.

3. In a perimeter, the combination of a perimeter arm of arc-shape, means for pivotally supporting the said arm, and a light situated co-axially of a circle including the said perimeter arm as a part thereof, and means for adjusting the said light simultaneously with the pivotal movement of the said arc so as to maintain the light and arc in the same relative positions with respect to each other.

4. In a perimeter, the combination of an arc-shaped perimeter arm, a pivot for supporting the same to permit rotatable adjustments thereof, an arm having connection with the said pivot and extending inwardly and upwardly therefrom, and a light supported upon the said last mentioned arm, the said light being situated co-axially of a circle including the arc-shaped perimeter arm as an arcuate part thereof.

5. In a perimeter, the combination of a support terminating at its upper end in a bearing, a perimeter arm having a trunnion journaled in said bearing which perimeter arm is of arc-shape, an arm having connection with the said trunnion and extending upwardly and inwardly therefrom, and a light supported upon said arm which light is situated in the polar axis of a circle including the said perimeter arm as an arcuate part thereof.

6. In a perimeter, the combination of an arc-shaped perimeter arm, means for pivotally supporting the said arm, a light situated a distance from the plane of the said perimeter arm and in the polar axis of a circle including the said arm as an arcuate part, and means for supporting the said light in fixed relation to the said perimeter arm as the latter is turned upon its pivot.

7. In a perimeter, the combination of a perimeter arm of arc-shape, a light supported a distance from the plane of the said perimeter arm in the polar axis of a circle comprising the said arm as an arcuate part thereof, and a housing for the said light having openings whereby the light is allowed to fall upon the inner surface of the perimeter arm to illuminate the same uniformly.

8. In a perimeter, the combination of a support having a bearing at its upper end, an arc-shaped perimeter arm having a trunnion journaled in said bearing which trunnion is provided with an axial opening extending therethrough, a tubular member extending through said opening, and means for supporting said tubular member independently of the said trunnion, the said tubular member being adapted to support fixation devices independently of the said perimeter arm.

9. In a perimeter, the combination of an arc-shaped perimeter arm, means for uniformly illuminating the inner side of said arm independently of the position of the latter, means for supporting fixation devices independently of the perimeter arm to enable an observer to hold an eye in a fixed position upon a fixed point, and stimulus means adjustably supported upon the said perimeter arm.

10. In a perimeter, the combination of an arc-shaped perimeter arm, a light supported in position to uniformly illuminate the inner surface of said arm, means whereby the said arm and light may be simultaneously adjusted to different positions, means for supporting fixation devices in relatively fixed position with respect to the said perimeter arm and light, and adjustable stimulus means supported upon the said arm.

11. In a perimeter, the combination of an arc-shaped perimeter arm of suitable solid color, a light for uniformly illuminating the inner surface of the said arm which light occupies a fixed position relative to said arm, means for simultaneously adjusting the said arm and light, a stimulus carriage adjustably supported upon the said arm, a card supported upon the said stimulus carriage, and a color disk at the center of said card consisting of a contrasting color of the same brightness as that of the surrounding color of the card.

12. In a perimeter, the combination of an arc-shaped perimeter arm of mid-gray color, means for pivotally supporting said arm, a light situated in position to uniformly illuminate the inner concaved surface of said arm, means for supporting the said light so as to cause the same to rotate with the said arm when the latter is rotated without alteration of the relationship between the light and the arm, means for stationarily supporting fixation devices at the center of said arm, a stimulus carriage adjustably supported upon said arm, a gray colored card carried by the said carriage, and the said card having a stimulus object at its center consisting of a disk of a color of the same brightness as that of the gray color surrounding it.

13. In a perimeter, the combination of an arc-shaped perimeter arm and means for uniformly illuminating the inner concaved surface thereof with means for ascertaining the color sensitivity of eyes.

14. In a perimeter, the combination of an arc-shaped perimeter arm the inner surface of which is of a gray of desired brightness, means for pivotally supporting said arm, means for uniformly illuminating the inner concaved surface of said arm in any position to which it may be adjusted, means for supporting a fixation device in relatively fixed relation to the said arm, a gray stimulus card, means for supporting and adjusting the said card upon the said arm, and the said card having a stimulus object at its center consisting of a disk of a color of the same brightness as but contrasting with the surrounding color upon the said card, and a pre-exposure card adapted to be placed over the first mentioned card to temporarily conceal the stimulus object thereon from the observer whose eyes are being tested, the said pre-exposure card being of the same gray as the said stimulus card.

15. In a perimeter, the combination of a perimeter arm, means for pivotally supporting the same, and stationary means for stationarily supporting fixation devices coaxially with the axis of rotation of the said arm.

16. In a perimeter, the combination of a stimulus card of gray having a stimulus object thereon of a color of the same brightness as the gray of the said stimulus card and a pre-exposure card of a gray having the same brightness as the stimulus card and the stimulus object.

17. In a perimeter, the combination of a perimeter arm, means whereby said arm may be rotatably and also rectilinearly adjusted, a head rest, and means whereby the said head rest may be adjusted laterally, vertically and also toward and from the center of the said perimeter arm.

18. A perimeter comprising a fixation object, a lens interposed between said object and the eye of a patent which is being examined, and a perimeter arm having means thereon for examination of the eye while it is held on the said fixation object.

19. A perimeter comprising a fixation object, means for adjustably supporting said object, a lens located at a point between said fixation object and the eye of a patient which is being examined, and a perimeter arm having means thereon for examination of the eye while it is held on the said fixation object.

20. In a perimeter, the combination of an arc-shaped perimeter arm, means for uniformly illuminating the inner concave surface of said arm, a fixation object located in rear of the middle point of said arm, and a concentrating lens supported between said fixation object and the eye of a patient being examined.

21. In a perimeter, the combination of an arc-shaped perimeter arm, means for uniformly illuminating the inner concave surface of said arm, a fixation object located in rear of the middle point of said arm, a tubular structure located in front of the said fixation object and in alinement therewith, a concentrating lens mounted in the said tubular structure, and means providing peep sight openings in front of the middle point of the said perimeter arm, the said peep sight openings, the lens and the said fixation object being located in alinement.

22. In a perimeter, the combination of an arc-shaped perimeter arm, means for uniformly illuminating the inner concave surface of said arm, a fixation object located in rear of the middle point of said arm, a tubular structure mounted in rear of said arm intermediate the same and the said fixation object, the passageway through said tubular structure being in horizontal alinement with the middle point of said perimeter arm, a concentrating lens mounted within the opening through said tubular structure, an arm extending forwardly from the said perimeter arm, disks mounted upon said arm in spaced relation to each other, each of said disks having an opening therethrough, the said openings, the passageway through said tubular structure, the said lens and the said fixation object being in alinement with each other.

23. A perimeter comprising an arc-shaped perimeter arm, a fixation object located at the middle point of said arm, and means providing a peep sight opening in front of said test object intermediate the latter and the point of location of an eye to be examined.

In testimony that we claim the foregoing as our invention, we have hereunto signed our names this 21st day of December, A. D. 1922.

CLARENCE ERROL FERREE.
GERTRUDE RAND FERREE.